(12) United States Patent
Li

(10) Patent No.: US 11,547,086 B1
(45) Date of Patent: Jan. 10, 2023

(54) PET LIQUID FEEDING APPLIANCE

(71) Applicant: Shenzhen Lonnai Technology Co., Ltd., Shenzhen (CN)

(72) Inventor: Mei Li, Shenzhen (CN)

(73) Assignee: Shenzhen Lonnai Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/379,965

(22) Filed: Jul. 19, 2021

(51) Int. Cl.
  *A01K 9/00* (2006.01)
  *A01K 5/01* (2006.01)

(52) U.S. Cl.
  CPC .............. *A01K 9/005* (2013.01); *A01K 5/01* (2013.01)

(58) Field of Classification Search
  CPC .......... A01K 9/00; A01K 5/01; A01K 1/0356; A01K 39/02; A01K 39/0206; A01K 39/0213; A01K 39/022; A01K 39/024; A01K 39/026; A01K 39/04; A01K 7/00; A01K 7/02; A01K 31/005; A01K 31/17; A61J 11/045; A61J 11/04
  See application file for complete search history.

(56) References Cited

U.S. PATENT DOCUMENTS

| | | | | |
|---|---|---|---|---|
| 2,158,226 | A * | 8/1937 | Elsey | A01K 9/00 |
| 6,581,542 | B1 * | 6/2003 | Forster | A01K 9/00 119/71 |
| 2017/0105901 | A1 * | 4/2017 | Edgerley | A61J 11/00 |
| 2017/0340521 | A1 * | 11/2017 | Farhi | A61J 11/04 |

* cited by examiner

*Primary Examiner* — Joshua J Michener
*Assistant Examiner* — Henry Hooper Mudd
(74) *Attorney, Agent, or Firm* — Jeenam Park

(57) ABSTRACT

A pet liquid feeding appliance includes an appliance body and multiple feeding assemblies installed at an outer end of the appliance body. The appliance body defines a discharge port for use in conjunction with the feeding assembly, and is further provided with a feeding trough. The feeding assembly includes a fixing piece and a nipple installed at one end of the fixing piece. Both ends of the nipple are each provided with a clamping slot. The fixing piece is provided with a clamping column for use in cooperation with the nipple. The fixing piece and the nipple are detachably connected to each other. One end of the clamping column is provided with a hook, and one end of the fixing piece is provided with a liquid outlet. By providing multiple feeding assemblies, multiple pets can drink together at the same time.

6 Claims, 2 Drawing Sheets

PET LIQUID FEEDING APPLIANCE

TECHNICAL FIELD

This disclosure relates to the technical field of feeding equipment, and more particularly relates to a pet liquid feeding appliance.

BACKGROUND

In pet liquid feeding equipment, a basin is typically used. Some pet pups do not have the ability to lick, and so cannot drink liquids. Furthermore, the space around the basin is limited and cannot be shared by multiple pets to drink together. In addition, the nipple cannot be replaced if it is bitten and broken, and so it is needed to buy a whole new one, leading to waste of resources.

SUMMARY

In order to overcome the above-mentioned deficiencies, this disclosure aims to provide a technical solution that can solve the above-mentioned problems.

There is provided a pet liquid feeding appliance, comprising an appliance body and a plurality of feeding assemblies that are installed at an outer end of the appliance body. The appliance body is provided with a discharge port for use with the feeding assemblies, and is further provided with a feeding trough. The feeding assembly includes a fixing piece and a nipple. The nipple is installed at one end of the fixing piece. The two ends of the nipple are provided with clamping slots. The fixing piece is provided with a clamping column for use with the nipple. The fixing piece and the nipple are detachably connected. One end of the clamping column is provided with a hook, and one end of the fixing piece is provided with a liquid outlet.

In one embodiment, the fixing piece is provided with an insert block, and an insert groove for use with the insert block is arranged inside the nipple.

In one embodiment, a groove is provided at a lower end of the appliance body.

In one embodiment, the liquid outlet is arranged obliquely.

In one embodiment, a front end of the fixing piece is provided with rounded corners.

In one embodiment, the nipple is made of a natural rubber material.

Compared with the prior art, the present disclosure has the following beneficial effects. There are provided multiple feeding assemblies so that multiple pets can drink together at the same time. Furthermore, when the nipple is bitten and broken, it can be disassembled through the fitting of the clamping slot and the clamping column, and the nipple is not easy to slip off during installation by arranging the hook.

BRIEF DESCRIPTION OF DRAWINGS

For a clearer understanding of the technical solutions that are used in the embodiments according to the present disclosure or that are used in the related art, hereinafter the drawings that are required for the description of the embodiments disclosed herein or the related art will be briefly introduced. Apparently, the drawings in the following description merely represent some embodiments of the present disclosure, and for those having ordinary skill in the art, other drawings may also be obtained based on these drawings without investing creative efforts.

Figure 1:
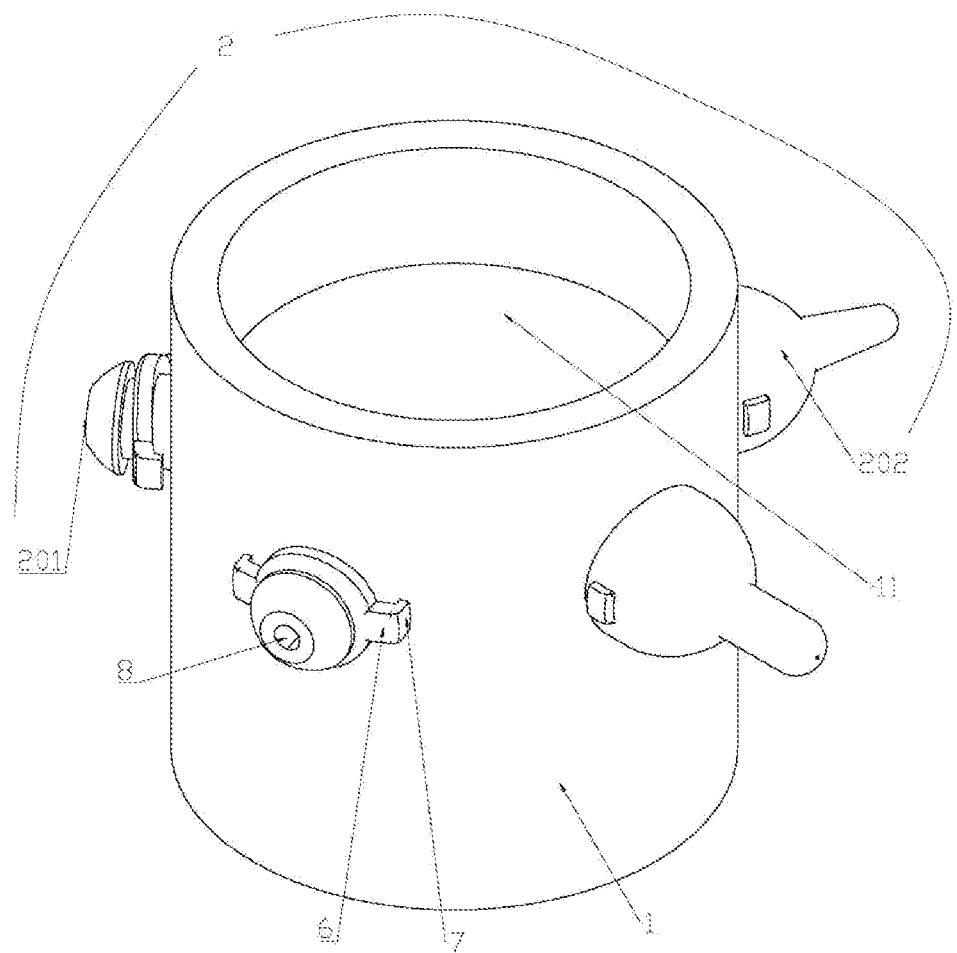
FIG. 1 is a schematic diagram of an embodiment according to the present disclosure.

In the drawings: 1—Appliance body, 2—Feeding assembly, 3—Discharge port, 4—Feeding trough, 5—Clamping slot, 6—Clamping column, 7—Hook, 8—Liquid outlet, 9—Insert block, 10—Insert groove, 11—Groove, 201—Fixing piece, 202—Nipple.

DETAILED DESCRIPTION OF ILLUSTRATIVE EMBODIMENTS

Hereinafter, technical solutions in the embodiments according to the present disclosure will be described in a definite and comprehensive manner. It is evident that the embodiments described herein are only a part, rather than all of the embodiments in accordance with the present disclosure. Based on the embodiments of the present disclosure, all other embodiments obtained by those having ordinary skill in the art without investing creative efforts shall all fall in the scope of protection of the present disclosure.

Figure 2:
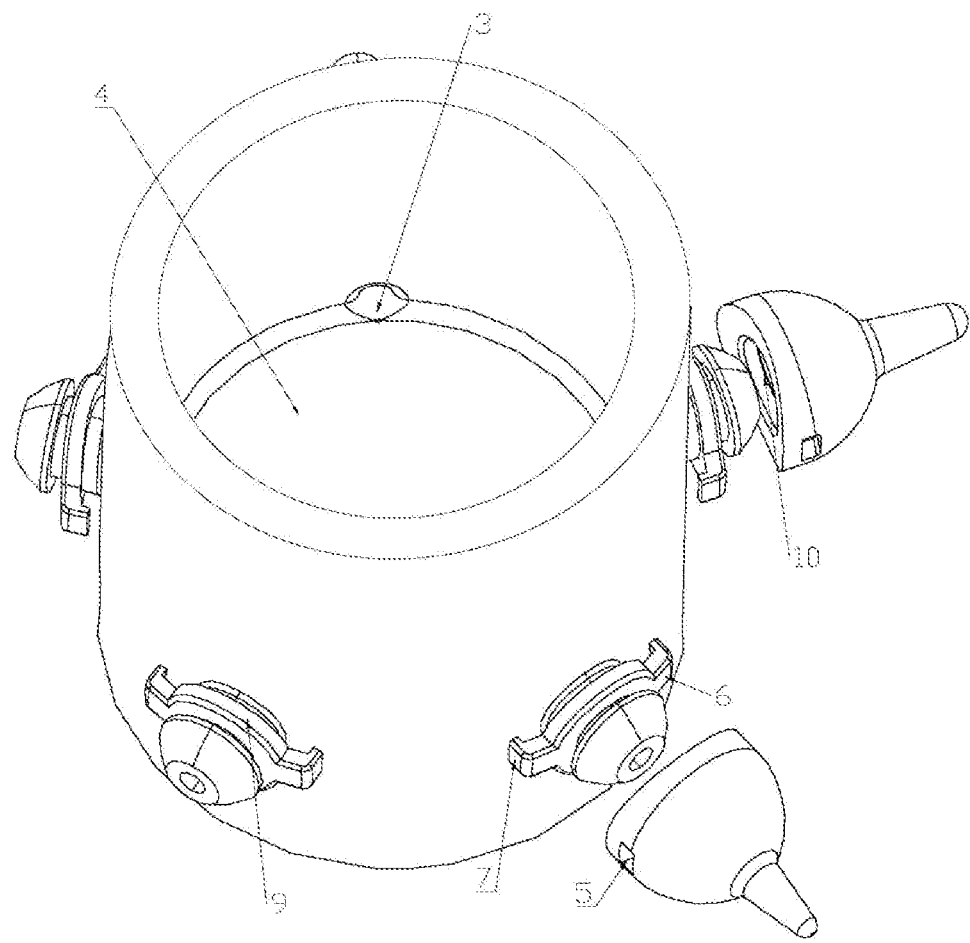
FIG. 2 is an exploded view of an embodiment according to the present disclosure.

In this embodiment, referring to FIGS. 1 to 2. A particular embodiment of a pet feeding liquid appliance includes an appliance body 1 and a plurality of feeding assemblies 2. The feeding assembly 2 is installed at an outer end of the appliance body 1. The appliance body 1 is provided with a discharge port 3 used in conjunction with the feeding assembly 2. The appliance body 1 is provided with a feeding trough 4. The feeding assembly 2 includes a fixing piece 201 and a nipple 202. The nipple 202 is installed at one end of the fixing piece 201. The two ends of the nipple 202 are each provided with a clamping slot 5. The fixing piece 201 is provided with a clamping column 6 used in conjunction with the nipple 202. The fixing piece 201 and the nipple 202 are detachably connected. A hook 7 is provided at one end of the clamping column 6. One end of the fixing piece 201 is provided with a liquid outlet 8. The fixed piece 201 is provided with an insert block 9. The nipple 202 is provided with a insert groove 10 for use in conjunction with the insert block 9. The nipple 202 can be better fixed through the use of the insert block 9 and the insert groove 10. The lower end of the appliance body 1 is provided with a groove 11. The device body 1 can be firmly supported by setting the groove 11. The liquid outlet 8 is arranged obliquely. The front end of the fixing piece 201 is provided with rounded corners. The nipple 202 is made of a natural rubber material. When using the present disclosure, the nipple 202 is installed at one end of the fixing piece 201, and is further fastened to the fixing piece 201 by the snap connection between the clamping slot 5 and the clamping column 6, and then the liquid is allowed to flow into the nipple 202 by the liquid outlet 8 for pets to drink. Furthermore, the hook 7 to is arranged to hold the nipple 202, so that the nipple 202 is not easy to fall off.

For those skilled in the art, it is evident that the present disclosure will not be limited to the details of the foregoing exemplary embodiments, and the present disclosure can be implemented in other specific forms without departing from the spirit or basic characteristics of the present disclosure. Therefore, from any point of view, the embodiments should be regarded as exemplary and non-restrictive. The scope of the present disclosure is defined in and by the appended claims rather than the foregoing description, and therefore it is intended that all changes falling within the meaning and scope of equivalent elements of the claims are included in the present disclosure.

What is claimed is:

1. A liquid feeding appliance for a pet, comprising an appliance body and a plurality of feeding assemblies, wherein each of the plurality of feeding assemblies is installed at an outer end of the appliance body, and the appliance body defines a discharge port configured to be used in conjunction with the feeding assembly, and further defines a feeding trough;

wherein the feeding assembly comprises a fixing piece and a nipple installed at one end of the fixing piece, wherein both ends of the nipple each define a clamping slot, wherein the fixing piece comprises a clamping column for use in conjunction with the nipple, wherein the fixing piece and the nipple are detachably connected to each other, and wherein one end of the clamping column comprises a hook, and one end of the fixing piece defines a liquid outlet.

2. The liquid feeding appliance of claim 1, wherein the fixing piece comprises an insert block, and there is defined an insert groove inside the nipple for use in cooperation with the insert block.

3. The liquid feeding appliance of claim 1, wherein there is defined a groove at a lower end of the appliance body.

4. The liquid feeding appliance of claim 1, wherein the liquid outlet is arranged obliquely.

5. The liquid feeding appliance of claim 1, wherein a front end of the fixing piece is provided with rounded corners.

6. The liquid feeding appliance of claim 1, wherein the nipple is made of a natural rubber material.

\* \* \* \* \*